US008622184B2

(12) United States Patent
Sakai et al.

(10) Patent No.: US 8,622,184 B2
(45) Date of Patent: Jan. 7, 2014

(54) ONE-WAY CLUTCH

(75) Inventors: Masaki Sakai, Fukuroi (JP); Takashi Kurita, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 377 days.

(21) Appl. No.: 12/904,620

(22) Filed: Oct. 14, 2010

(65) Prior Publication Data
US 2011/0088988 A1 Apr. 21, 2011

(30) Foreign Application Priority Data

Oct. 19, 2009 (JP) .................................. 2009-240601

(51) Int. Cl.
*F16D 41/066* (2006.01)
(52) U.S. Cl.
USPC ............ 192/45.008; 192/45.018; 192/45.019; 192/45.02
(58) Field of Classification Search
USPC ............. 192/45.008, 45.017, 45.018, 45.019, 192/45.02; 267/166.1, 169, 288
See application file for complete search history.

(56) References Cited

U.S. PATENT DOCUMENTS

| 2,172,653 | A | * | 9/1939 | Flogaus | .................... 192/45.008 |
| 3,373,855 | A | * | 3/1968 | Ericson | ......................... 192/203 |
| 6,093,991 | A | * | 7/2000 | Tanaka | ..................... 192/45.008 |
| 8,393,453 | B2 | * | 3/2013 | Shirataki et al. | ......... 192/45.016 |
| 2008/0236977 | A1 | * | 10/2008 | Akiyoshi | ......................... 192/45 |
| 2009/0277739 | A1 | * | 11/2009 | Takasu | ............................ 192/45 |

FOREIGN PATENT DOCUMENTS

| JP | 61-184134 U | 11/1986 |
| JP | 2003-113871 A | 4/2003 |
| JP | 2008-133864 A | 6/2008 |
| JP | 2008-261488 A | 10/2008 |
| JP | 2009-210096 A | 9/2009 |

OTHER PUBLICATIONS

Office Action issued May 23, 2013, in Japanese Patent Application No. 2009-240601.

* cited by examiner

*Primary Examiner* — Rodney Bonck
(74) *Attorney, Agent, or Firm* — Miles & Stockbridge P.C.

(57) ABSTRACT

A one-way clutch includes an outer race, an inner race which is spaced from the outer race in an inside diameter direction and arranged concentrically so as to be relatively rotatable, a plurality of engaging members which are arranged between the outer race and the inner race to transmit a torque, and a cage which retains the engaging members. The one-way clutch is provided with volute springs which urge the engaging members in the direction in which the engaging members engage with a cam face of the outer race or the inner race.

12 Claims, 3 Drawing Sheets

ONE-WAY CLUTCH

BACKGROUND OF THE INVENTION

1. Field of the Invention

The present invention relates to a one-way clutch used as parts such as those for backstop and torque transmission in the driving apparatus of, for example, an automobile and an industrial machine.

2. Description of the Related Art

In general, a one-way clutch is provided with an outer race, an inner race which is arranged concentrically with the outer race, a plurality of rollers which are arranged between the inner race and the outer race to transmit a torque, a cage which retains the rollers, and spring members which urge the rollers in the direction in which the rollers engage with a cam face of the outer race or the inner race.

In such an arrangement, the one-way clutch is such that due to a cam mechanism including the rollers and the cam face, in a case where the cam face is provided in the outer race, the inner race is rotated only in a single direction with respect to the outer race. That is, the inner race runs idle in one direction with respect to the outer race and can give a rotary torque to the outer race in the reverse direction alone through the cam mechanism. At this time, the rollers are urged in the meshing direction (engaging direction) by urging members such as springs.

In the one-way clutch disclosed in Japanese Patent Application Laid-Open No. 2008-261488, for example, accordion springs are used as spring members which urge the rollers in the direction in which the rollers engage with the cam face of the outer race or the inner race.

However, when accordion springs are used, it is necessary that holes or concavities for mounting be formed in the outer race or the inner race, posing the problem that it is impossible to reduce costs. Also, mounting methods are relatively complicated, posing another problem that the stress concentration at a maximum contraction is relatively high. Similar problems occurred also with coil springs.

In particular, embrittlement may occur under impact and load because of the relatively high stress concentration at a maximum contraction, with the result that the roller urging force becomes unstable, leading to unstable operations of the one-way clutch.

SUMMARY OF THE INVENTION

Therefore, the object of the present invention is to provide a one-way clutch whose operation is made stable by using a volute spring which enables costs to be reduced, permits easy mounting and makes it possible to reduce stress concentration at a maximum contraction.

To achieve the above object, the one-way clutch of the present invention is a one-way clutch including an outer race, an inner race which is spaced from the outer race in an inside diameter direction and arranged concentrically so as to be relatively rotatable, a plurality of engaging members which are arranged between the outer race and the inner race to transmit a torque, and a cage which retains the engaging members. This one-way clutch is provided with volute springs which urge the engaging members in the direction in which the engaging members engage with a cam face of the outer race or the inner race.

According to the present invention, effects as given below are obtained. It becomes unnecessary to form holes or concavities for mounting spring members in the outer race or the inner race, and costs can be reduced. Mounting methods are relatively easy.

Because stress concentration at a maximum contraction can be reduced, there is no possibility that the spring members become brittle under impact and load, and the roller urging force become stable, leading to stable operations of the one-way clutch.

By inserting a guide pin into the leading end of the volute spring or mounting a cover thereon, it is possible to protect the volute spring from impacts during the spring back (hopping) of the engaging members.

The volute spring has the advantage that it is possible to obtain a relatively large load and absorption energy in spite of a small space volume for installation compared to other springs. For this reason, the installation space can be made compact.

Because of the provision of the volute springs which urge the engaging members in the direction in which the engaging members engage with the can face of the outer race or the inner race, it becomes unnecessary to form holes or concavities for mounting the spring members in the outer race or the inner race and costs can be reduced. Mounting methods become relatively simple.

The term "engaging member" used in the present invention refers to a member which engages (meshes) with the cam face of the outer race or the inner race. The engaging member has any shape so long as the engaging member can engage with the cam face of the outer race or the inner race. Examples of the engaging member include a roller, a sphere and a spherical sprag.

DESCRIPTION OF THE EMBODIMENTS

Figure 1:
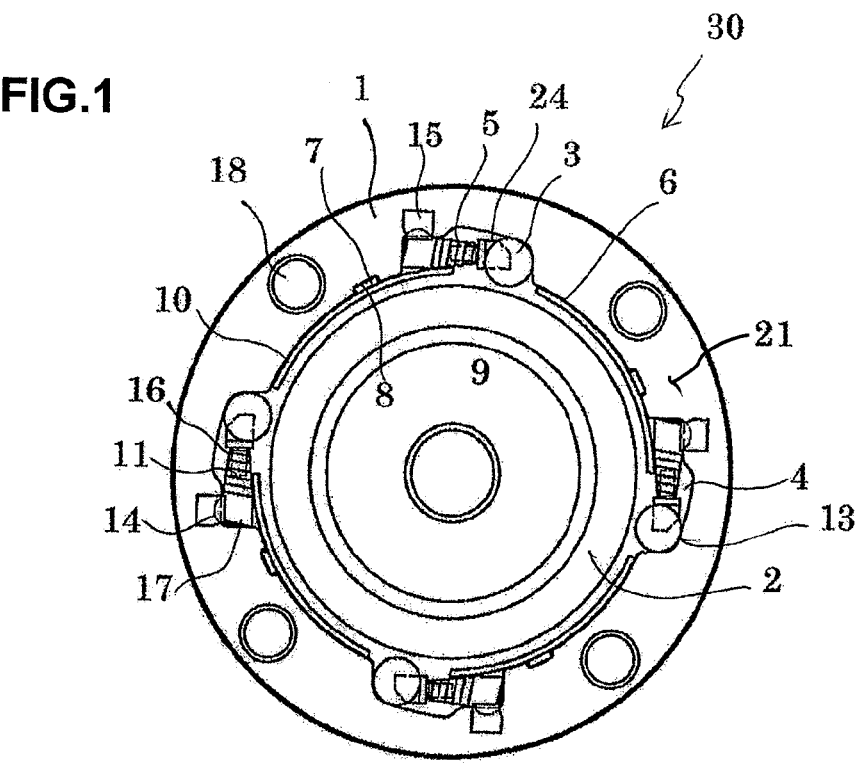
FIG. 1 is a front view of a one-way clutch in an embodiment of the present invention.

The present invention will be described in detail below with reference to the drawings. The embodiment described below is intended for describing the present invention for illustrative purposes, and it is needless to say that the embodiment does not limit the present invention. In each of the drawings, like reference characters refer to like parts.

FIG. 1 is a front view showing a one-way clutch 30 in an embodiment of the present invention and shows that the one-way clutch 30 is in an engaged condition. The following description is given to describe the present invention for illustrative purposes, and it is needless to say that the embodiment does not limit the present invention.

The one-way clutch 30 is provided with an outer race 1, an inner race 2 which is spaced from the outer race 1 in an inside diameter direction and arranged concentrically so as to be relatively rotatable, a plurality of engaging members, i.e., rollers 3 which are arranged between the outer race 1 and the inner race 2 and transmit a torque, and a cage 6 which retains the rollers 3. Furthermore, this one-way clutch 30 is provided with volute springs 5 which urge the rollers 3 in the direction in which the rollers 3 engage with a cam face of the outer race 1 or the inner race 2.

Pockets 4 are formed along the inner surface of the outer race 1 as concavities which are concave radially outward. The pockets 4 are provided in four places at circumferentially equal intervals. A cam face 13 with which the roller 3 engages is formed in an outer circumferential wall of the pocket 4. Within each of the pockets 4, there are arranged the roller 3 and a volute spring 5 which urges the roller 3 in the direction of engagement (meshing) with the cam face 13.

In an annular space defined between the outer race 1 and the inner race 2, there is arranged the cage 6 having a cylindrical portion 10. The cylindrical portion 10 of the cage 6 is provided with windows 9 which are located in four places at circumferentially equal intervals. Each of the windows 9 is radially through, retains and guides the roller 3. Each of the windows 9 has the shape of a rectangle whose four sides are surrounded. In FIGS. 1 to 4, in order to facilitate the explanation of the movement of the roller 3, a portion corresponding to the side of the rectangle on the front side is opened and illustration is omitted. The cylindrical portion 10 is provided by an incision with a projection 7 which projects in the outside diameter direction. A conventional i-bar or T-bar may be provided as the projection 7. The arrangement of the projections 7 is such that one projection 7 is provided between two windows 9.

The projection 7 of the cage 6 fits into a groove 8 which is provided along the inner circumference of the outer race 1 and extends axially. Therefore, the cage 6 comes into contact with the inner circumferential face of the outer race 1, rotates in synchronization with the outer race 1 and hence cannot rotate relatively. However, the cage 6 can rotate relatively with the inner race 2.

In order to fix the outer race 1 to another member (not shown in the figures), on an axial end face 21 of the outer race 1, there are provided screw holes 18 at circumferentially equal intervals so as to be through axially. Second pockets 14 smaller than the pockets 4 are provided adjacent to the pockets 4.

The volute spring 5 which urges the roller 3 is formed by winding round a tape-like metal plate material in a conical or frustoconical shape by leaving a space in the middle, and has a frustoconical appearance having different diameters at two axial ends. The end turn of the spring body is such that the outside diameter thereof is smallest in a top portion 16 and largest in a bottom portion 17. The bottom portion 17 of the volute spring 5 is housed in the second pocket 14. The bottom portion 17 is provided with an end portion 15 which extends from the end turn, and this end portion 15 is fixed to the axial end face 21 of the outer race 1 by any of spot welding, brazing and adhesive bonding. It is also possible to fix the volute spring 5 by sandwiching the end portion 15 between a side plate 50, shown in fragmentary section in FIG. 5, and the end face 21 of the outer race 1. By doing like this, the volute spring 5 is positively retained in the pocket 4 and the second pocket 14 and becomes stable in posture. As a result of this, it is possible to give a stable urging force to the roller 3.

A guide pin 11 having a head 12 is inserted into the leading end, i.e., the top portion 16 of the volute spring 5. Therefore, the urging force of the volute spring 5 is given to the roller 3 through the head 12 of the guide pin 11. It is also possible to mount a cover member (not shown) onto the head 16 without inserting the guide pin 11. It is not always necessary to provide the guide pin 11 or the cover member. However, by providing the guide pin 11 or the cover member, it is possible to protect the volute spring 5 from impacts during the bounceback (hopping) of the roller 3.

As with the bottom portion 17, also the top portion 16 of the volute spring 5 is provided with an end portion 24 which extends from the end turn. This end portion 24 is in sliding contact with the axial end face of the roller 3. In FIG. 1, the end portion 24 is partially indicated by a wavy line because the end portion 24 is on the other side of the roller 3.

Figure 2:
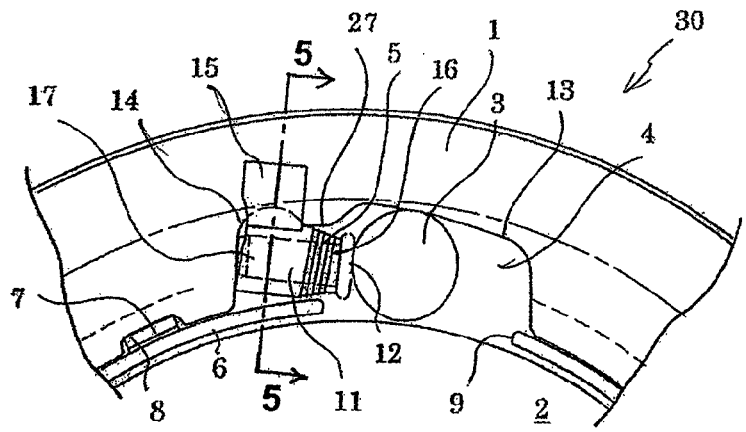
FIG. 2 is a partial front view of a portion in the vicinity of a pocket of a one-way clutch in an embodiment of the present invention and shows the idling condition of the one-way clutch.

FIG. 2 is a partial front view of a portion in the vicinity of a pocket of a one-way clutch in an embodiment of the present invention and shows the idling condition of the one-way clutch. In this condition, the volute spring 5 is compressed by a pressing force from the roller 3 and is most folded (contracted to a maximum degree). In an idling condition, because the roller 3 does not gear with the cam face 13 of the pocket 4, the inner race 2 runs idle with respect to the outer race 1 and the outer race 1 and the inner race 2 do not rotate in synchronization with each other. That is, torque transmission through the roller 3 does not occur.

Figure 3:
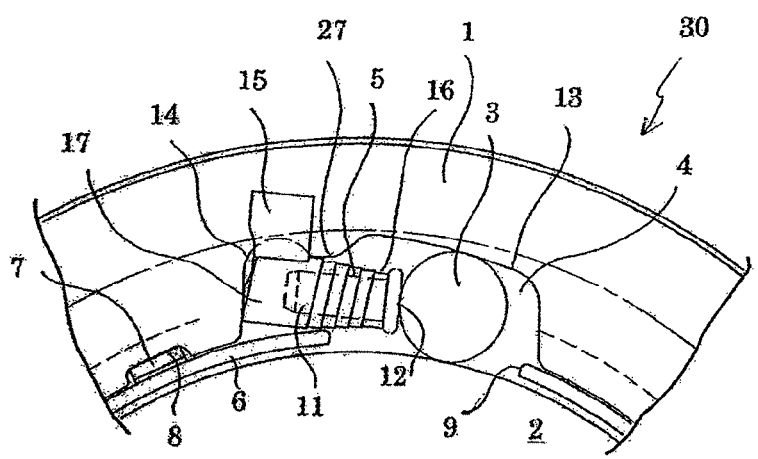
FIG. 3 is a partial front view of a portion in the vicinity of a pocket of a one-way clutch in an embodiment of the present invention and shows that the one-way clutch is in a condition intermediate between an engaged condition and an idling condition.

FIG. 3 is a partial front view of a portion in the vicinity of a pocket of a one-way clutch in an embodiment of the present invention and shows that the one-way clutch is in a condition intermediate between an engaged condition and an idling condition. In this condition, the volute spring 5 resists the pressing force from the roller 3 with part of the urging force and has begun to elongate. When the volute spring 5 is in the condition of FIG. 3, the roller 3 does not completely gear with the cam face 13 of the pocket 4 and hence the inner race 2 is in a sliding condition with respect to the outer race 1. Therefore, the outer race 1 and the inner race 2 do not rotate in synchronization with each other. That is, torque transmission through the roller 3 scarcely occurs.

Figure 4:
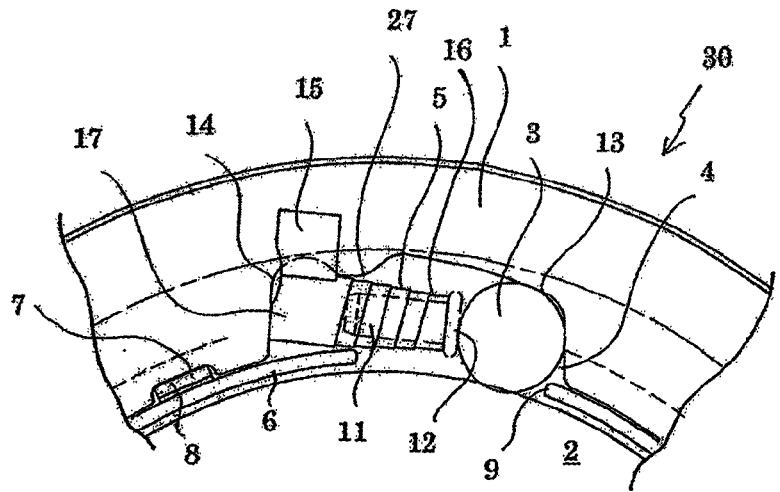
FIG. 4 is a partial front view of a portion in the vicinity of a pocket of a one-way clutch in an embodiment of the present invention and shows that the one-way clutch is in an engaged condition.

FIG. 4 is a partial front view of a portion in the vicinity of a pocket of a one-way clutch in an embodiment of the present invention and shows that the one-way clutch is in an engaged condition. In this condition, the urging force of the volute spring 5 is larger than the pressing force from the roller 3 and the volute spring 5 is in a most elongated condition. When the volute spring 5 is in the condition of FIG. 4 (the one-way clutch 30 is in an engaged condition), the roller 3 is urged by the urging force of the volute spring 5 so as to mesh with the cam face 13 of the pocket 4, and the inner race 2 is in a locked condition with respect to the outer race 1. At this time, the outer race 1 and the inner race 2 rotate in positive synchronization with each other and torques are transmitted through the roller 3. In FIGS. 2 to 4, the end portion 24 of the volute spring 5 shown in FIG. 1 is omitted.

Figure 5:
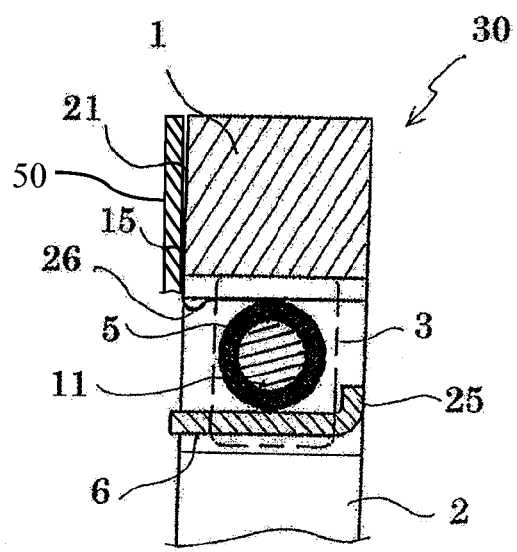
FIG. 5 is an axial sectional view taken along the line 5-5 of FIG. 2.

FIG. 5 is an axial sectional view taken along the line 5-5 of FIG. 2. The volute spring 5 is fixed at the end portion 15 to the axial end face 21 of the outer race 1. The end portion 15 which extends from the bottom portion 17 of the volute spring 5 extends tangentially from the bottom portion 17 of the end turn and is bent substantially at a right angle from there, whereby the end portion 15 is formed. The end portion 15 has a bent portion 26 in a position corresponding to the boundary between the pocket 4 of the outer race 1 and the end face 21.

As shown in FIG. 5, the cage 6 is provided with a flanged portion 25 at the other end portion in the axial direction, and retains the roller 3 (indicated by an imaginary line in FIG. 5) at both ends of the windows 9 in the axial direction. The end turn of the volute spring 5 is retained by being sandwiched between a convex 27 projecting in an inside diameter direction, which is situated between the pocket 4 and the second pocket 14, and the outer circumferential face of the cylindrical portion 10 of the cage 6. Therefore, the volute spring 5 can give a stable urging force to the roller 3.

In this embodiment, a volute spring 5 having the following specification was used as an example.

| | |
|---|---|
| Plate width | 4.5 mm |
| Plate thickness | 0.06 mm |
| Spring length | 16 mm |
| Number of turns | 6 |
| Minimum average radius (top portion) | 1.5 mm |
| Maximum average radius (bottom portion) | 2.5 mm |
| Spring constant | 0.0728 N/mm |

Figure 6:
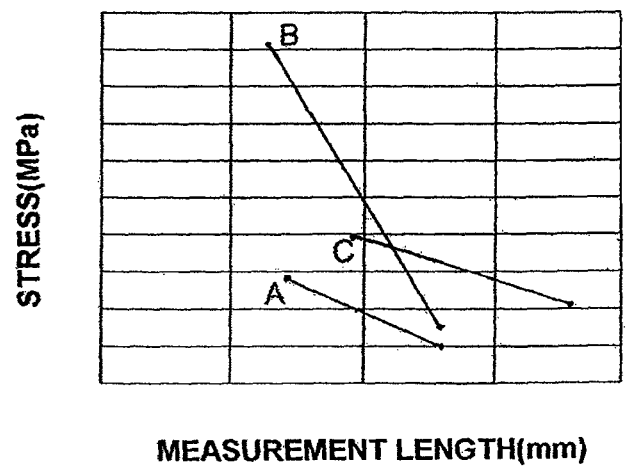
FIG. 6 is a diagram of lines of stress of a volute spring, an accordion spring and a coil spring.
Figure 7:
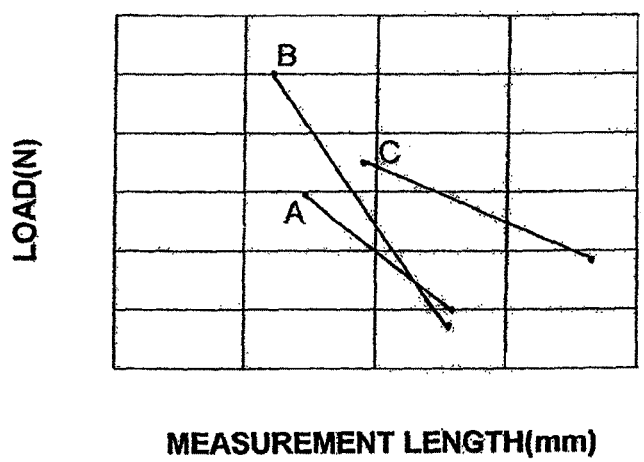
FIG. 7 is a diagram of spring force (loads) of a volute spring, an accordion spring and a coil spring.

FIGS. 6 and 7 show the results of a comparative verification of the above-described volute spring 5, a conventional accordion spring and a conventional coil spring. FIG. 6 is a diagram of lines of stress of the volute spring 5, the conventional accordion spring and the conventional coil spring. FIG. 7 is a diagram of spring force (loads) of the volute spring 5, the conventional accordion spring and the conventional coil spring. In the graphs of FIGS. 6 and 7, A denotes the volute spring, B denotes the accordion spring, and C denotes the coil spring.

As is apparent from FIGS. 6 and 7, the stress at a maximum contraction is very small in the volute spring compared to the accordion spring and is small also compared to the coil spring. Therefore, the effect that stress concentration at a maximum contraction is prevented is achieved in the volute spring. Also, in the volute spring 5, changes in both stress and load per unit measurement length are small compared to the conventional accordion spring and coil spring, and it is apparent from FIGS. 6 and 7 that the accordion spring is stable in this respect.

In the above embodiment, the description was given of the case where the cam face 13 with which the roller 3 engages is provided in the outer race 1. However, the cam face 13 may also be provided on the side of the inner race 2. In this case, the pocket 4 can be provided on the outer circumferential face of the inner race 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240601, filed Oct. 19, 2009, which is hereby incorporated by reference herein in its entirety.

What is claimed is:

1. A one-way clutch comprising:
an outer race;
an inner race which is spaced from the outer race in an inside diameter direction and arranged concentrically so as to be rotatable relative to the outer race;
a plurality of engaging members which are arranged between the outer race and the inner race to transmit a torque; and
a cage which retains the engaging members,
wherein the one-way clutch is provided with volute springs which urge the engaging members in a direction in which the engaging members engage with a cam face of one of the outer race and the inner race, and each of the volute springs is retained by being sandwiched between a convex inward projection of the outer race and an outer circumferential face of a cylindrical portion of the cage, and
wherein a side plate is provided on an axial end face of the one-way clutch and the volute springs are fixed by being sandwiched between the side plate and the axial end face of the one-way clutch.

2. The one-way clutch according to claim 1, wherein the outer race has the cam face.

3. The one-way clutch according to claim 1, wherein the inner race has the cam face.

4. The one-way clutch according to claim 1, wherein the engaging members are rollers.

5. The one-way clutch according to claim 1, wherein a guide pin is inserted into a leading end of each of the volute springs.

6. The one-way clutch according to claim 1, wherein a cap is mounted on a leading end of each of the volute springs.

7. A one-way clutch comprising:
an outer race;
an inner race which is spaced from the outer race in an inside diameter direction and arranged concentrically so as to be rotatable relative to the outer race;
a plurality of engaging members which are arranged between the outer race and the inner race to transmit a torque; and
a cage which retains the engaging members,
wherein the one-way clutch is provided with volute springs which urge the engaging members in a direction in which the engaging members engage with a cam face of one of the outer race and the inner race, and
wherein a side plate is provided on an axial end face of the one-way clutch and the volute springs are fixed by being sandwiched between the side plate and the axial end face of the one-way clutch.

8. The one-way clutch according to claim 7, wherein the outer race has the cam surface.

9. The one-way clutch according to claim 7, wherein the inner race has the cam surface.

10. The one-way clutch according to claim 7, wherein the engaging members are rollers.

11. The one-way clutch according to claim 7, wherein a guide pin is inserted into a leading end of each of the volute springs.

12. The one-way clutch according to claim 7, wherein a cap is mounted on a leading end of each of the volute springs.

* * * * *